United States Patent
Tsuji et al.

(10) Patent No.: US 12,451,750 B2
(45) Date of Patent: Oct. 21, 2025

(54) STATOR OF ROTATING ELECTRICAL MACHINE

(71) Applicants: DENSO CORPORATION, Kariya (JP); AISIN CORPORATION, Kariya (JP); TOYOTA JIDOSHA KABUSHIKI KAISHA, Toyota (JP)

(72) Inventors: Takuro Tsuji, Kariya (JP); Junichi Sugawara, Kariya (JP); Yoshihiro Takahara, Toyota (JP)

(73) Assignees: DENSO CORPORATION, Kariya (JP); AISIN CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/173,305

(22) Filed: Feb. 23, 2023

(65) Prior Publication Data

US 2023/0283138 A1    Sep. 7, 2023

(30) Foreign Application Priority Data

Mar. 1, 2022 (JP) .................................. 2022-031327

(51) Int. Cl.
*H02K 3/50* (2006.01)
*H02K 11/25* (2016.01)

(52) U.S. Cl.
CPC ............... *H02K 3/50* (2013.01); *H02K 11/25* (2016.01); *H02K 2203/09* (2013.01)

(58) Field of Classification Search
CPC .. H02K 3/38; H02K 3/30; H02K 3/32; H02K 3/34; H02K 3/345; H02K 3/325; H02K 15/10; H02K 15/105; H02K 15/12
See application file for complete search history.

(56) References Cited

U.S. PATENT DOCUMENTS 10,319,496 B2 *  6/2019  Fujimori .................. H02K 3/30
11,784,530 B2 * 10/2023  Hirai ...................... H02K 3/521
                                                              310/71

(Continued)

FOREIGN PATENT DOCUMENTS

EP    4254745 A1 * 10/2023 ............. H02K 11/25
GB    2618588 A  * 11/2023 ............. H02K 15/12

(Continued)

OTHER PUBLICATIONS

EP4254745A1 Translation (Year: 2023).*
GB2618588A Translation (Year: 2023).*

*Primary Examiner* — Michael Andrews
*Assistant Examiner* — Nicholas Lee Setzer
(74) *Attorney, Agent, or Firm* — Oliff PLC

(57) ABSTRACT

In a stator for a rotating electrical machine, a stator core, and a stator winding are provided. The stator winding is located in or around the stator core and has a coil end exposed outside a corresponding end of the stator core. A neutral busbar is connected to the coil end of the stator winding, and a temperature sensor is mounted to the neutral busbar. A resinous seal includes an insulating resin, and the insulating resin of the resinous seal is arranged to cover an axial end portion of the coil end and the neutral busbar. The resinous seal is configured to have bubbles formed in the insulating resin. The bubbles are located around the neutral busbar.

8 Claims, 11 Drawing Sheets

(56) References Cited

U.S. PATENT DOCUMENTS

| | | | |
|---|---|---|---|
| 2012/0235524 A1* | 9/2012 | Sasaki | H02K 3/522 |
| | | | 310/71 |
| 2017/0294815 A1 | 10/2017 | Yokoi et al. | |
| 2020/0127518 A1* | 4/2020 | Azusawa | H02K 15/105 |
| 2020/0161915 A1* | 5/2020 | Kaneko | H02K 1/16 |
| 2021/0367489 A1 | 11/2021 | Goto et al. | |
| 2022/0165458 A1* | 5/2022 | Ushiwata | H01B 7/0233 |
| 2023/0034343 A1* | 2/2023 | Kashiwada | H02K 3/50 |
| 2023/0135939 A1* | 5/2023 | Ito | G01K 7/22 |
| | | | 310/71 |

FOREIGN PATENT DOCUMENTS

| | | |
|---|---|---|
| JP | 2017-192194 A | 10/2017 |
| JP | 2018-121491 A | 8/2018 |
| JP | 2020-167789 A | 10/2020 |
| JP | 2021-114877 A | 8/2021 |

* cited by examiner

STATOR OF ROTATING ELECTRICAL MACHINE

CROSS REFERENCE TO RELATED DOCUMENT

The present application claims the benefit of priority of Japanese Patent Application No. 2022-031327 filed on Mar. 1, 2022, the disclosure of which is incorporated in its entirety herein by reference.

BACKGROUND

1 Technical Field

This disclosure relates generally to a stator of a rotating electrical machine.

2 Background Art

An example of rotating electrical machines, which is equipped with a stator having phase stator windings, is configured such that a coil end of each of the stator windings is commonly connected to a neutral busbar, and the neutral busbar includes a temperature sensor mounted thereto.

In such a rotating electrical machine, the coil ends of the respective stator windings and the neutral busbar are encapsulated in a resinous seal, which is disclosed in, for example, Japanese Patent First Publication No. 2018-121491.

Phase currents flowing through the respective phase stator windings concentratedly flow through the neutral busbar. This enables the temperature sensor mounted to the neutral busbar to measure a value of the temperature of the stator.

Unfortunately, a usually lower thermal resistance of the resinous seal may cause heat to be easily dissipated from the neutral busbar. This may result in the temperature of the stator, which is measured by the temperature sensor, being lower than an actual value of the temperature of the stator.

SUMMARY

This disclosure was made in view of the above problems. It is an object to provide a stator of a rotating electrical machine which enables a value of the temperature of a stator to be measured more properly.

A first measure of this disclosure provides a stator for a rotating electrical machine. The stator includes a stator core, and a stator winding located in or around the stator core. The stator winding has a coil end exposed outside a corresponding end of the stator core. The stator includes a neutral busbar connected to the coil end of the stator winding, and a temperature sensor mounted to the neutral busbar. The stator includes resinous seal. The resinous seal includes an insulating resin, and the insulating resin of the resinous seal is arranged to cover an axial end portion of the coil end and the neutral busbar. The resinous seal is configured to have bubbles formed in the insulating resin. The bubbles are located around the neutral busbar.

This configuration of the resinous seal enables the thermal resistance of a surrounding portion of the insulating resin, which is located around the neutral busbar, to be higher, making it possible to reduce heat dissipation from the neutral busbar through the insulating resin of the resinous seal. This reduction in the heat dissipation from the neutral busbar curbs a decrease in the temperature of the neutral busbar, making it possible for the temperature sensor mounted to the neutral busbar to measure a value of the temperature of the stator with higher accuracy.

A second measure, which depends on the first measure, provides the stator in which the resinous seal has opposing first and second outer surfaces, and the neutral busbar has opposing first and second major surfaces. The first and second major surfaces are arranged to face the respective first and second outer surfaces. The bubbles include at least one of (i) first bubbles located between the first outer surface of the resinous seal and the first major surface of the neutral busbar, and (ii) second bubbles located between the second outer surface of the resinous seal and the second major surface of the neutral busbar.

Because heat in the neutral busbar is likely to be dissipated from each of the larger first and second major surfaces of the neutral busbar, the first bubbles located between the first major surface of the neutral busbar and the first outer surface of the resinous seal makes it possible to reduce heat dissipation from the neutral busbar through the first major surface of the neutral busbar. Alternatively, the second bubbles located between the second major surface of the neutral busbar and the second outer surface of the resinous seal make it possible to reduce heat dissipation from the neutral busbar through the second major surface of the neutral busbar.

A third measure, which depends on the first measure, provides the stator in which the bubbles formed in the insulating resin of the resinous seal include one or more bubbles located to be in contact with at least part of an outer periphery of the neutral busbar.

The difference in linear expansion coefficient between the insulating resin of the resinous seal and the neutral busbar would cause distortions to be likely to occur, due to, for example, thermal stress, in the inner periphery of the insulating resin of the resinous seal, which is in contact with the outer periphery of the neutral busbar. An entrance of a cooling medium into the cracks may result in promotion of heat dissipation from the neutral busbar, causing the temperature of the neutral busbar being lower as compared with a proper temperature.

From this viewpoint, the resinous seal is configured such that the bubbles formed in the insulating resin have one or more bubbles located to be in contact with at least part of the outer periphery of the neutral busbar. This configuration minimizes the risk of the occurrence of cracks in the insulating resin of the resinous seal due to, for example, thermal stress, thus reducing heat dissipation from the neutral busbar due to cracks in the insulating resin. This accordingly makes it possible for the temperature sensor mounted to the neutral busbar to measure a value of the temperature of the stator with higher accuracy.

A fourth measure, which depends on the first measure, provides the stator in which the neutral busbar has corners, and the bubbles include one or more bubbles located around each corner of the neutral busbar.

The inner periphery of the insulating resin of the resinous seal has the concave portions, each of which is in contact with a corresponding one of the corners of the neutral busbar. Extension or shrinkage of the insulating resin of the resinous seal due to temperature change of the stator may result in stress concentration onto each concave portion of the inner periphery of the insulating resin of the resinous seal. This therefore would result in cracks being likely to occur at each concave portion of the inner periphery of the insulating resin of the resinous seal.

From this viewpoint, the resinous seal is configured such that the bubbles formed in the insulating resin include one or more bubbles located around each corner of the neutral busbar. This configuration minimizes the risk of the occurrence of cracks at each concave portion of the inner periphery of the insulating resin of the resinous seal, thus reducing heat dissipation from the neutral busbar due to cracks in the insulating resin. This accordingly makes it possible for the temperature sensor mounted to the neutral busbar to measure a value of the temperature of the stator with higher accuracy.

A fifth measure, which depends on the first measure, provides the stator in which the stator winding is comprised of multiphase stator windings. The resinous seal includes a first region and a second region. The first region is arranged to encapsulate ends of the respective multiphase stator windings, and the second region is arranged to encapsulate the neutral busbar. The bubbles include (i) first regional bubbles included in the bubbles and formed in the first region, and (ii) second regional bubbles included in the bubbles and formed in the second region. A number or a number density of the first regional bubbles is smaller than a number or a number density of the second regional bubbles.

The number or the number density of the first regional bubbles formed in the first region arranged to surround the ends of the respective multiphase stator windings is smaller than the number or the number density of the second regional bubbles formed in the second region arranged to surround the neutral busbar. In other words, the number or the number density of the second regional bubbles formed in the second region arranged to surround the neutral busbar is greater than the number or the number density of the first regional bubbles formed in the first region arranged to surround the ends of the respective multiphase stator windings.

This prevents poor electrical isolation between the ends of the respective multiphase stator windings due to the existence of bubbles in the first region arranged to surround the ends of the respective multiphase stator windings.

A sixth measure, which depends on the first measure, provides the stator in which the neutral busbar has one end portion folded back over an end of a remaining portion of the neutral busbar to form a U-shaped clamp having two arms. The temperature sensor is sandwiched by the two arms of the U-shaped clamp.

This holds the temperature sensor more stably.

BRIEF DESCRIPTION OF THE DRAWINGS

The present disclosure will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF PREFERRED EMBODIMENTS

A rotating electrical machine in an embodiment will be described below with reference to the drawings. Parts of the embodiments and modifications functionally or structurally corresponding to each other or associated with each other will be denoted by the same reference numbers for the brevity of explanation. Explanation of the parts denoted by the same reference numbers will be omitted. The rotating electrical machine in the embodiment is designed as an electrical motor which may be used in wheeled vehicles or aerial vehicles.

The rotating electrical machine in this embodiment is equipped with a three-phase winding, which is an example of a multi-phase stator winding, and may also be operable as a permanent magnet synchronous motor, a wound-field synchronous motor, or an induction machine.

Figure 1:
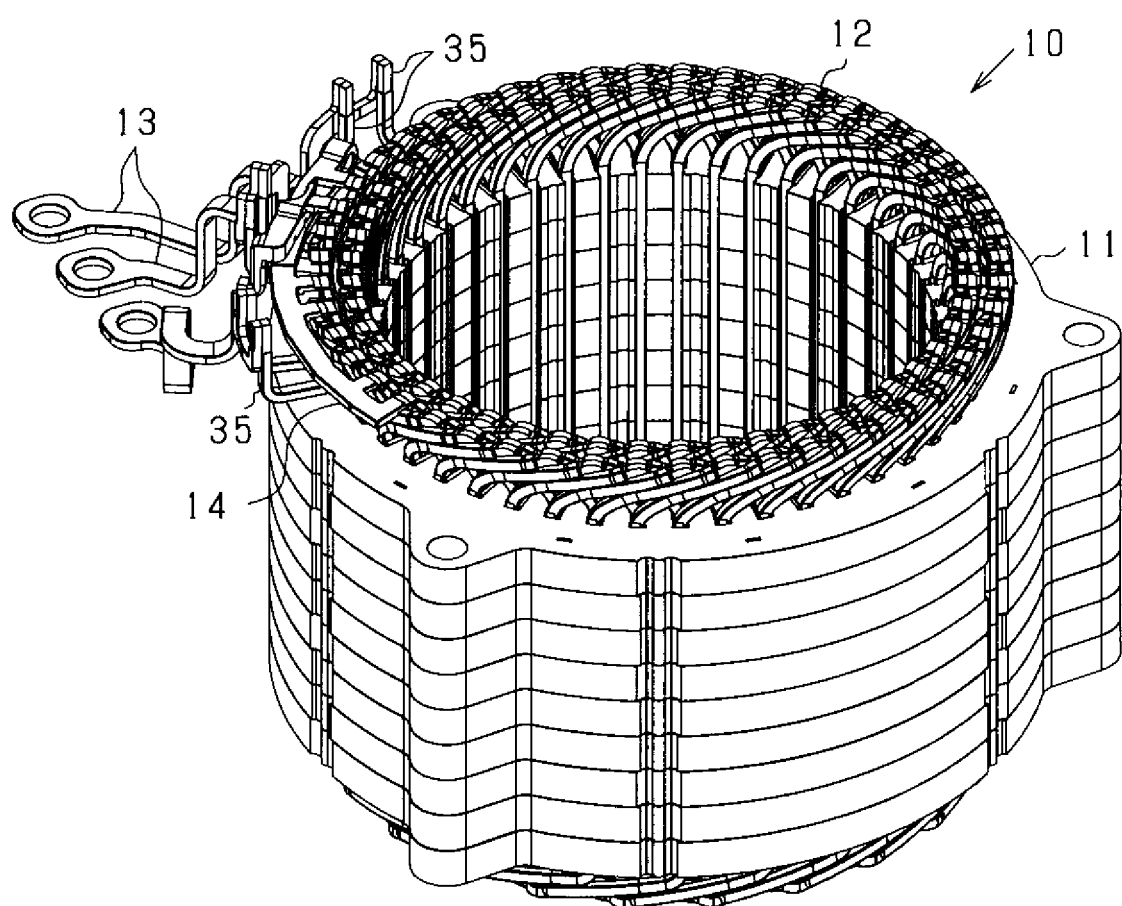
FIG. 1 is a perspective view of a stator, from which a resinous seal is omitted, according to an embodiment.

The rotating electrical machine, as illustrated in FIG. 1, includes the hollow cylindrical stator 10, from which a resinous seal described later has been removed, and a rotor (not shown) disposed radially inside the stator 10. The rotor is disposed to be rotatable relative to the stator 10 around an axis of rotation thereof. In the following discussion, an axial direction indicates an axial direction of the stator 10 extends, in other words, a direction in which the axis of rotation of the rotor extends. A radial direction, as referred to herein, denotes a radial direction of the stator 10, in other words, a direction which passes through the center of the axis of rotation of the rotor and extends perpendicular to the axis of rotation of the rotor. A circumferential direction, as referred to herein, indicates a circumferential direction of the stator 10, in other words, a direction extending around the axis of rotation of the rotor.

Figure 2:
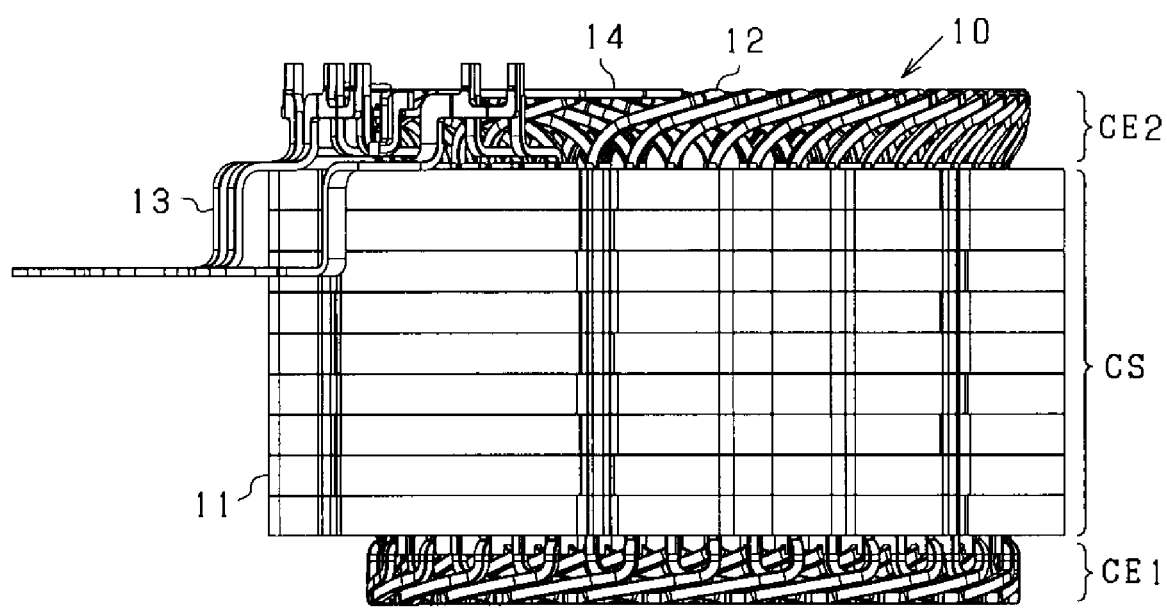
FIG. 2 is a front view of the stator illustrated in FIG. 1.

The stator 10, as can be seen in FIGS. 1 and 2, includes the annular stator core 11 and the stator winding 12 wound around the stator core 11. The rotating electrical machine in this embodiment is designed as an inner-rotor rotating electrical machine which has the rotor disposed radially inside the stator 10 to be rotatable. The stator winding 12 is made of a three-phase winding assembly including a U-phase winding, a V-phase winding, and a W-phase winding. Each of the U-phase winding, the V-phase winding, and the W-phase winding has a first end connected to the power busbar 13, and a second end, which is opposite to the first end, is connected to the neutral bus bar 14. The stator winding 12 is made up of an in-slot coil section CS overlapping the stator core 11 in the radial direction and coil ends CE1 and CE2 lying outside the ends of the stator core 11 in the axial direction.

Figure 3:
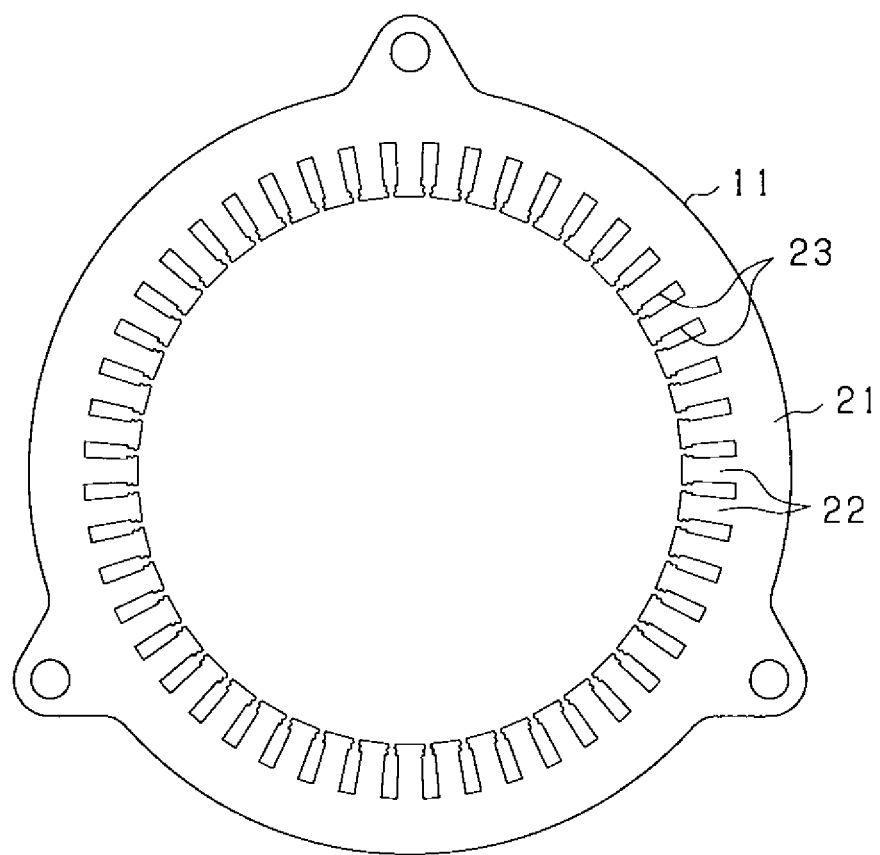
FIG. 3 is a plan view of a stator core of the stator illustrated in FIG. 1.

The stator core 11, as illustrated in FIG. 3, includes the annular back yoke 21 and the teeth 22 which protrude radially inward from the back yoke 21 and are arranged adjacent each other at a given interval away from each other in the circumferential direction. The stator core 11 also has formed therein the slots 23 each of which is disposed between a respective adjacent two of the teeth 22. Each of the slots 23 is shaped to have an opening which has a length extending in the radial direction. The slots 23 are arranged at equal intervals away from each other in the circumferential direction of the stator core 11. The stator winding 12 is wound in or extend through the slots 23. The stator core 11 is made of a stack of a plurality of core plates made of magnetic members, such as magnetic steel sheets.

The U-phase winding, the V-phase winding, and the W-phase winding of the stator winding 12 are connected in the form of a Y-connection (i.e., star connection). The stator winding 12 is supplied with electric power (AC power) from a power source through an inverter, not shown, to generate magnetic flux. The stator winding 12 is formed by the conductor segments each of which is made of a U-shaped electrical conductor which is of a rectangular cross-section. The structure of the conductor segments 30 of the stator winding 12 will be described below in detail.

Figure 4:
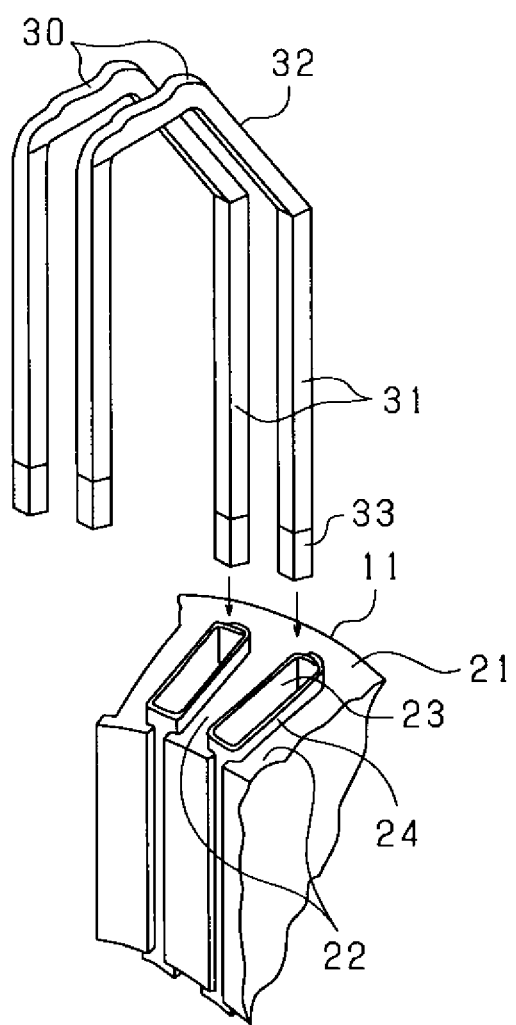
FIG. 4 is a perspective view that illustrates conductor segments of a stator winding of the stator and a portion of the stator core illustrated in FIG. 3.

FIG. 4 is a perspective view which illustrates the conductor segments and a portion of the stator core 11. Each of the conductor segments 30, as can be seen in FIG. 4, includes a pair of U-shaped straight sections 31 and the turn 32 curved or bent to connect the pair of U-shaped straight sections 31. The straight sections 31 are longer than a dimension of the stator core 11 in the axial direction, that is, the thickness of the stator core 11. Each of the conductor segments 30 is made of a flat conductor which is of a rectangular transverse section with pairs of opposed flat surfaces and covered with an insulating layer. Each of the straight sections 31 has the exposed conductive portion 33 produced by removing the insulating layer from an end thereof.

The conductor segments 30 are inserted into the slots 23 of the stator core 11 and arranged in line in the radial direction within each of the slots 23. In this embodiment, the straight sections 31 of the conductor segments are disposed in the form of a stack of four layers in each of the slots 23. The straight sections 31 of each of the conductor segments 30 are arranged in two of the slots 23 which are located at a given number of coil pitches away from each other.

Each of the straight sections 31 has a portion which is disposed inside the slot 23 and defines the in-slot coil section CS of the stator winding 12. Each of the slots 23 has disposed therein the insulating sheet 23 which electrically isolate the stator winding 12 (i.e., the conductor segments 30) from the stator core 11. The insulating sheet 24 is folded to enclose the conductor segments 30 disposed in the form of a four-layer stack in each of the slots 23 and held between an inner circumferential surface (i.e., an inner wall surface) of the stator core 11 and such a stack of the conductor segments 30.

The paired straight sections 31 of each of the conductor segments 30 are arranged in the two slots 23 (which will also be referred to below as first and second slots 23) at positions shifted by one layer from each other in the radial direction. For instance, one of the paired straight sections 31 is arranged at the $n^{th}$ layer position within the first slot 23 where the $n^{th}$ layer which is counted from the radially deepest portion of the first slot 23 (i.e., from the back yoke 21) lies, while the other straight section 31 is arranged at the $(n+1)^{th}$ layer position within the second slot 23 where the $(n+1)^{th}$ layer which is counted from the radially deepest portion of the second slot 23 lies.

The installation of each of the conductor segments 30 in a respective one of the slots 23 of the stator core 11 is achieved by inserting each of the straight sections 31 into the slot 23 from a first end that is one of axially opposed ends of the stator core 11 to have an end portion thereof protruding outside a second end that is the other end of the stator core 11. This forms the coil end CE1 by the turn 32 of the conductor segment 30 on the first end of the stator core 11 and also forms the coil end CE2 on the second end of the stator core 11. The coil end CE2 is made of ends of the straight sections 31 of the conductor segments 30 inserted into two of the slots 23. Such ends are opposite ends of the straight sections 31 to the turns 32, bent in the circumferential direction, and are joined together. The coil ends CE1 and CE2 are schematically illustrated in FIG. 2. The joints of the conductor segments 30 at the coil end CE2 will be described below in detail. How to join the conductor segments 30 will first be described.

Figure 5:
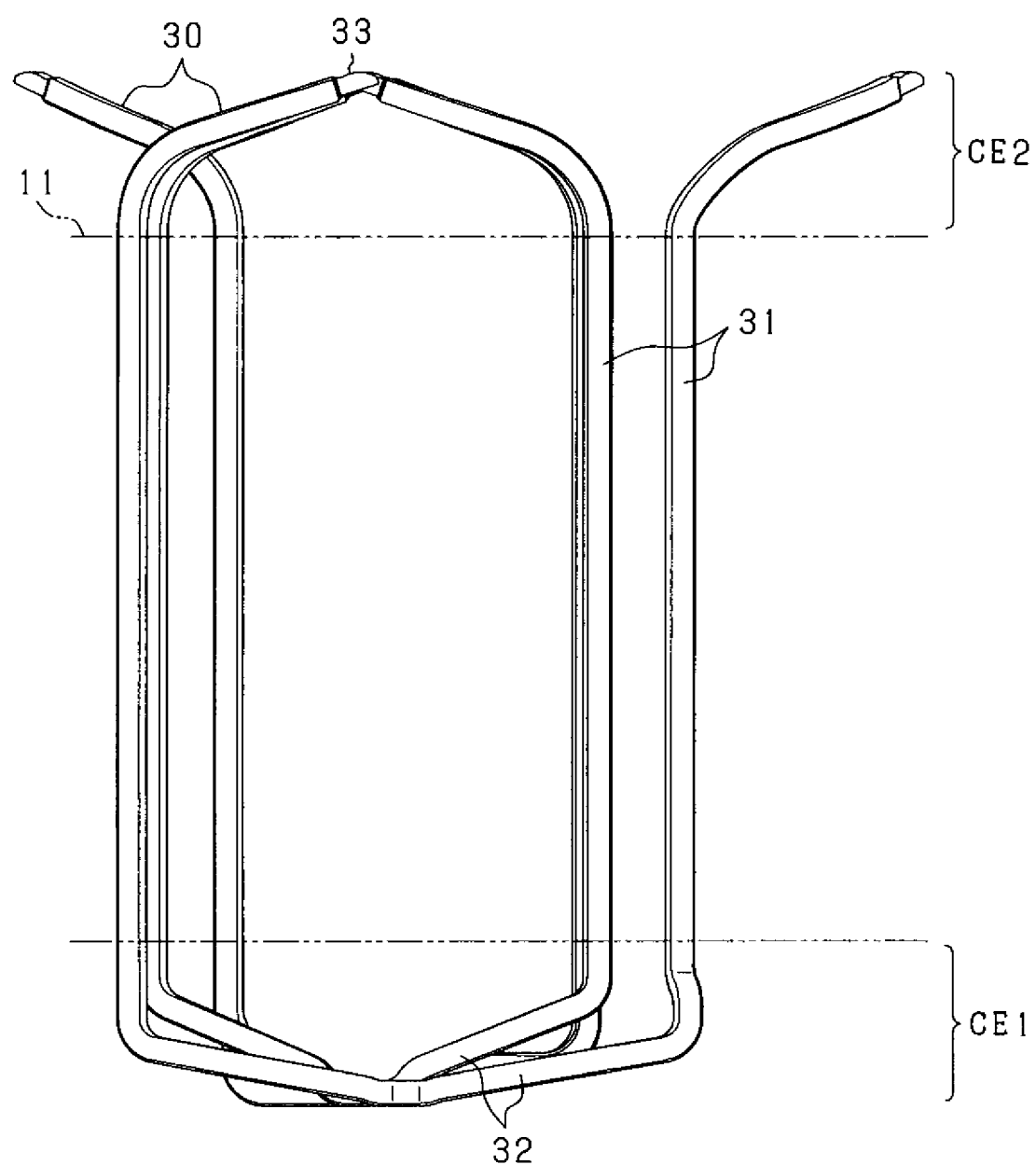
FIG. 5 is a perspective view of some of conductor segments, which are disposed in slots of the stator core, of the stator winding of the stator illustrated in FIG. 1.

FIG. 5 illustrates the conductor segments 30 disposed in the slots 23. Double-dotted lines indicate the stator core 11. End portions of the paired straight sections 31 of each of the conductor segments 30 which are far away from the turn 32 protrude the end surface (i.e., upper end surface, as viewed in the drawing) of the stator core 11 are bent obliquely in the circumferential direction at a given angle to the end surface of the stator core 11. The exposed conductive portions 33 of a respective two of the conductor segments 30 are welded together, thereby connecting all the conductor segments 30 together.

The coil end CE2 is formed by joining the end of one of the conductor segments 30 which extends in a first circumferential direction outside the end of the stator core 11 with the end of one of the conductor segments 30 which extends in a second circumferential direction opposite the first circumferential direction outside the end of the stator core 11. This causes portions of the straight sections 31 of a respective two of the conductor segments 30 of the stator winding 12 to extend obliquely in the axial direction and meet together at the joint to define the coil end CE2. Some of the conductor segments 30 have the end portions of the straight sections 31 which are bent in the first circumferential direction, while the other conductor segments 30 have the end portions of the straight segments 31 which are bent away from the turn 32 in the second circumferential direction.

Each of the U-phase, V-phase, and W-phase windings is comprised of a middle portion constructed by connection of the conductor segments 30 of the corresponding one of the phase winding. Each of the U-phase, V-phase, and W-phase windings is comprised of opposing first and second ends. The first ends of the U-phase, V-phase, and W-phase windings are commonly joined the neutral busbar 14. The second end of each of the U-phase, V-phase, and W-phase windings is joined to a corresponding one of power busbars 13.

The structure of the neutral busbar 14 will be described below in detail.

Figure 6A:
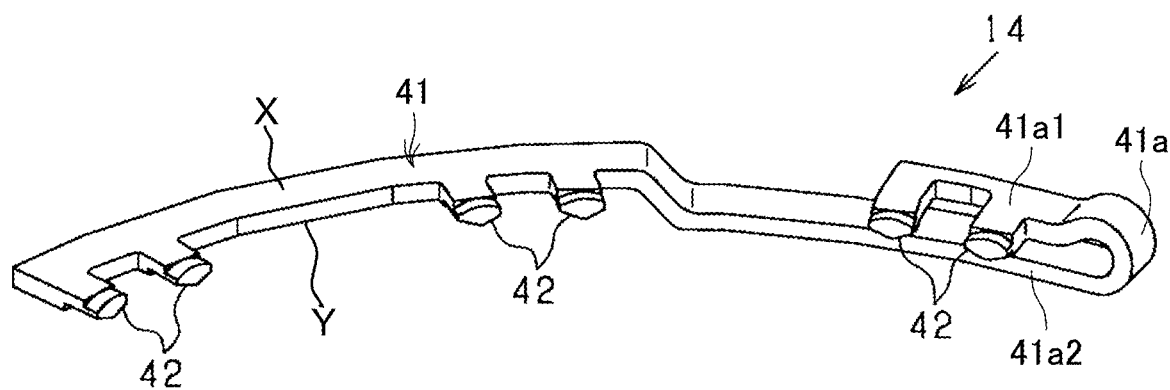
FIG. 6A is a perspective view of a neutral busbar illustrated in FIG. 2.
Figure 6B:
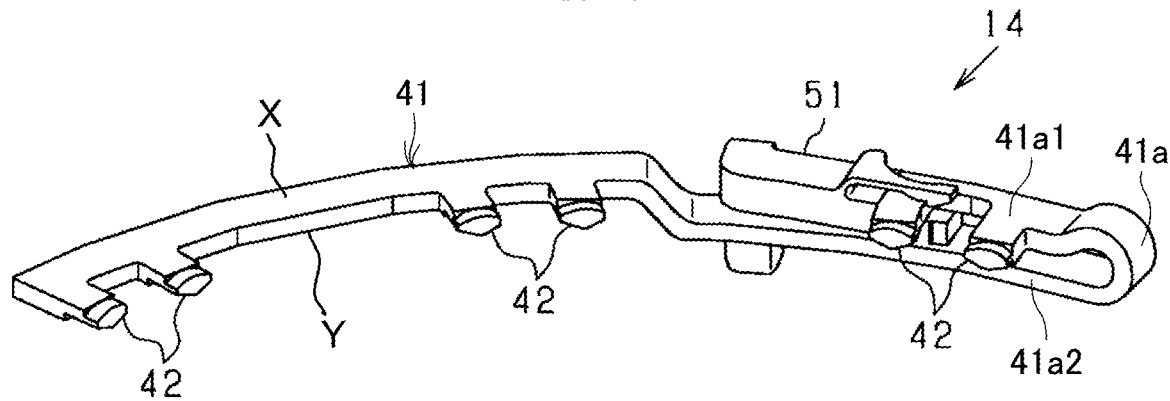
FIG. 6B is a perspective view of the neutral busbar and a temperature sensor mounted to the neutral busbar.

FIG. 6A is a perspective view of the neutral busbar 14, and FIG. 6B is a perspective view of the neutral busbar 14 and the temperature sensor 51 mounted to the neutral busbar 14.

The neutral busbar 14 is made of a rectangular conductor and includes the body 41 in a long plate shape and a plurality of connecting portions 42 protruding from the body 41.

That is, the outer periphery of the plate-like neutral busbar 14, i.e., the body 41 thereof, includes opposing upper and lower major surfaces and opposing side minor surfaces.

The body 41 is designed to have an arc-shaped length. After being secured to the stator winding 12, the neutral busbar 14 is oriented to have the body 41 extending in the circumferential direction and the connecting portions 42 extending radially inward from the body 41. The connecting portions 42 have ends which face in the radial direction and connect with the second ends of the U-, V-, and W-phase windings which form the coil end CE2.

The body 41 is made of an elongated strip member. One end portion 41a1 of the body 41 of the neutral busbar 14 is folded back over an end 41a2 of the remaining portion of the body 41 to form a U-shaped clamp 41a having two arms 41a1 and 41a2. The arms 41a1 and 41a2 of the U-shaped clamp 41a are arranged in the axial direction with the arm 41a1 being located above the arm 41a2. The temperature sensor 51 is mechanically sandwiched by the arms 41a1 and 41a2 of the U-shaped clamp 41a. The temperature sensor 51 works to measure the temperature of the stator 10. The temperature sensor 51 is made in the form of a temperature sensor module including a thermistor and an electrical circuit.

Figure 7:
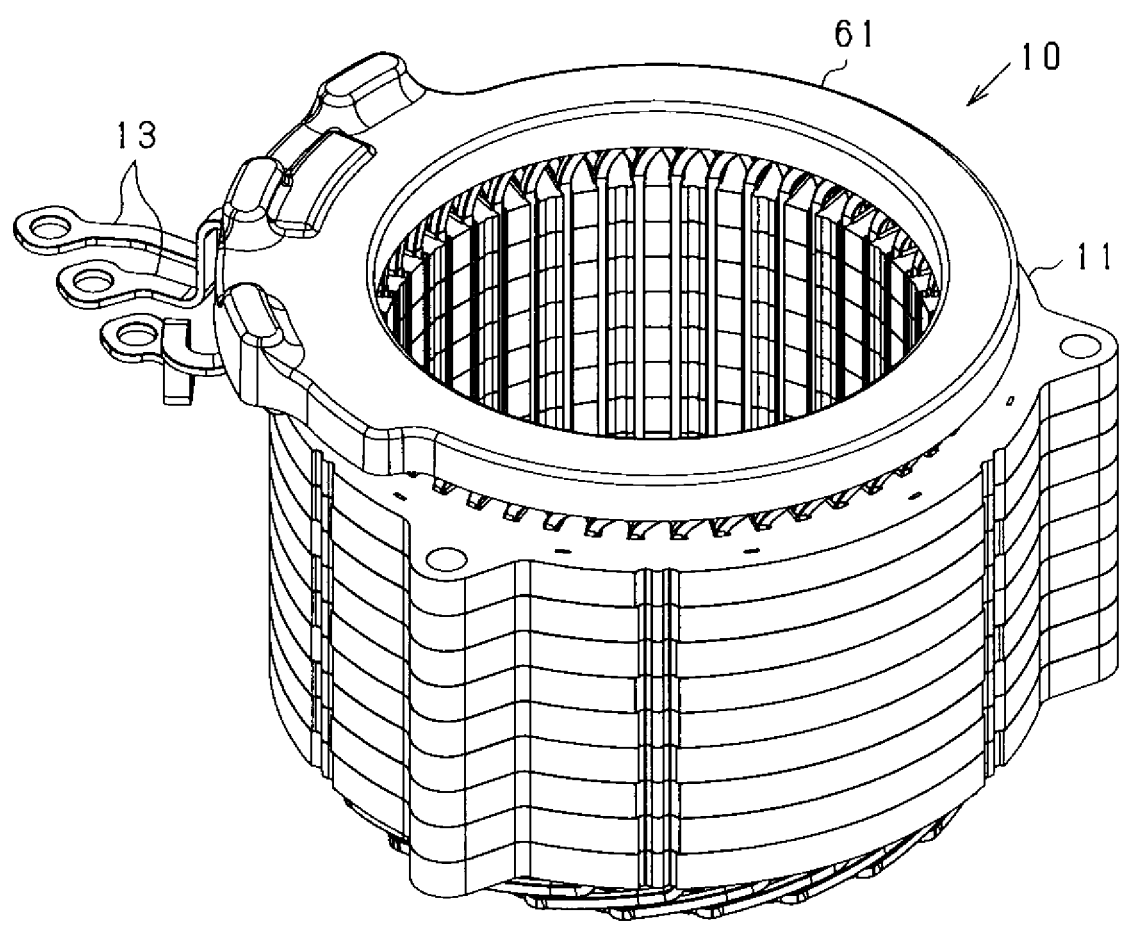
FIG. 7 is a perspective view of the stator to which the resinous seal has been mounted.

The stator 10, as can be seen in FIG. 7, has the resinous seal 61 which is arranged above the second end of the stator core 11 and made from insulating resin electrically covering or encapsulating the coil end CE2. The resinous seal 61 is of an annular shape and encloses the welds of the conductor segments 30 and the neutral busbar 14. The resinous seal 61 also encloses therein the temperature sensor 51 mounted to the neutral busbar 14.

The resinous seal 61 occupies an axial portion of the coil end CE2.

The resinous seal 61 has opposing outer upper surface and an outer lower surface in the axial direction.

Specifically, the resinous seal 61 is shaped to axially cover the joints or welds of the conductor segments 30 and the neutral busbar 14 and located away from an axial end surface, which faces the coil end CE2, of the stator core 11, thus creating an air gap between the axial end surface of the stator core 11 and the outer lower surface of the resinous seal 61; the outer lower surface of the resinous seal 61 faces the axial end surface of the stator core 11. The air gap serves as a coil cooler to dissipate thermal energy from the stator winding 12. For instance, a flow of cooling medium, such as cooling oil, cooling water, or cooling air, may be created in the coil cooler to cool the stator winding 12.

The insulating resin of the resinous seal 61 may cause heat dissipation from the neutral busbar 14 therethrough, resulting in a decrease in the temperature of the neutral busbar 14. Specifically, a larger surface area of the neutral busbar 14 than a surface area of each phase stator winding 12 may cause heat dissipation from the neutral busbar 14 to be more accelerated than heat dissipation from each phase stator winding 12, resulting in the temperature of the neutral busbar 14 being lower than the temperature of each phase stator winding 12. A decrease in the temperature of the neutral busbar 14 may make it difficult to accurately measure the temperature of the stator 10.

From this viewpoint, the resinous seal 61 according to this embodiment is configured to have bubbles formed in a portion of the insulating resin thereof. The portion of the insulating resin, which has formed therein the bubbles, is located around the neutral busbar 14. The portion of the insulating resin, which has formed therein the bubbles and is located around the neutral busbar 14, will also be referred to as a surrounding portion.

This configuration of the resinous seal 61 enables a thermal resistance of the surrounding portion of the insulating resin, which is located around the neutral busbar 14, to be higher, making it possible to reduce heat dissipation from the neutral busbar 14 through the insulating resin of the resinous seal 61.

Figure 8:
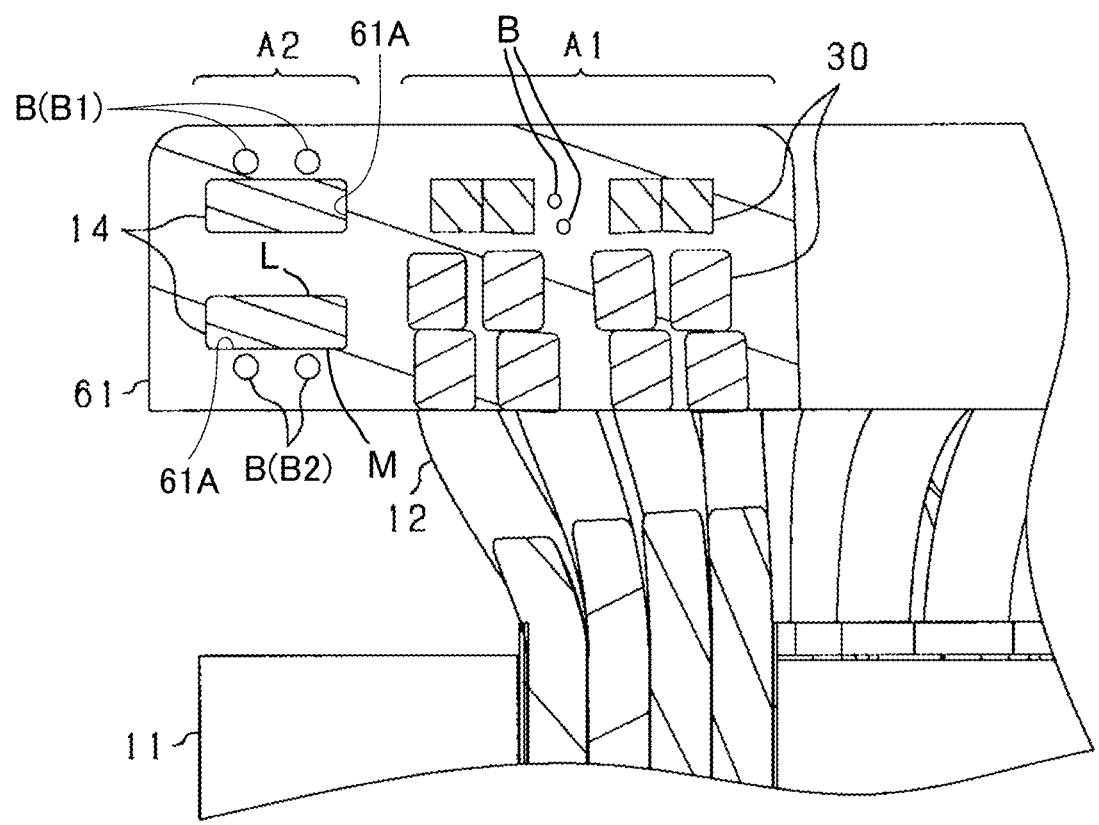
FIG. 8 is an enlarged vertical cross section of the resinous seal, which vertically transverses through two arms of a U-shaped clamp of a body of the neutral busbar.

The following describes a specific example of the configuration of the resinous seal 61 with reference to FIG. 8. FIG. 8 is an enlarged vertical cross section of the resinous seal 61, which vertically transverses through the two arms 41a1 and 41a2 of the U-shaped clamp 41a of the body 41.

Bubbles (see reference character B), as can be seen in FIG. 8, are formed in the resinous seal 61. Specifically, the bubbles B include upper bubbles B1 located between an upper major surface of the arm 41a1, which is located above the arm 41a2, and the outer upper surface of the resinous seal 61. Similarly, the bubbles B include lower bubbles B2 located between a lower major surface of the arm 41a2, which is located below the arm 41a1, and the outer lower surface of the resinous seal 61. That is, the upper bubbles B1 are located to be farther away from the stator core 11 than the lower bubbles B2 are, in other words, the lower bubbles B2 are located to be closer to the stator core 11 than the upper bubbles B1 are. The bubbles B can include bubbles located between the arms 41a1 and 41a2 of the U-shaped clamp 41 aligned in the axial direction.

The bubbles B can preferably include bubbles located along the longitudinal direction of the neutral busbar 14 while surrounding the neutral busbar 14.

The remaining portion 41b of the body 41 of the neutral busbar 14 except for the U-shaped clamp 14a has opposing upper and lower surfaces, and the bubbles B can preferably include bubbles located adjacent to at least one of the upper and lower surfaces of the remaining portion 41b of the body 41 of the neutral busbar 14.

The bubbles B located around the neutral busbar 14 in the resinous seal 61 cause the thermal resistance of the surrounding portion of the insulating resin, which is located around the neutral busbar 14, to be higher, making it possible to reduce heat dissipation from the neutral busbar 14 through the insulating resin of the resinous seal 61.

In other words, the insulating resin of the resinous seal 61 has an annular opening bounded by an inner periphery 61A and configured to be in conformity with the annular neutral busbar 14, and the annular neutral busbar 14 is fitted in the annular opening of the insulating resin of the resinous seal 61. The bubbles B formed in the insulating resin are located around the inner periphery 61A of the insulating resin of the resinous seal 61.

In the resinous seal 61, minute bubbles may be dispersed. In this case, the surrounding portion of the insulating resin of the resinous seal 61, which is located adjacently around the neutral busbar 14, can preferably have formed therein bubbles, the size of each of which is larger than bubbles located in other portions of the insulating resin except for the surrounding portion.

Alternatively, in this case, the number of bubbles formed in the surrounding portion of the insulating resin per unit volume can be preferably greater than the number of bubbles formed in the other portions of the insulating resin per unit volume.

The insulating resin of the resinous seal 61 has a predetermined linear expansion coefficient, and the neutral busbar 14 has a predetermined linear expansion coefficient that is set to be different from the linear expansion coefficient of the insulating resin of the resinous seal 61. The difference in linear expansion coefficient between the neutral busbar 14 and the insulating resin of the resinous seal 61 would cause the insulating resin to be distorted due to temperature change of the insulating resin. For example, the difference in linear expansion coefficient between the neutral busbar 14 and the insulating resin of the resinous seal 61 would cause the insulating resin to expand due to temperature increase of the insulating resin.

The distortion, such as expansion or shrinkage, of the insulating film of the resinous seal 61 would cause a risk of the occurrence of cracks in the insulating resin of the resinous seal 61. An extension of a crack in the insulating resin of the resinous seal 61 up to any outer surface of the resinous seal 61 would cause the entrance of the cooling medium into the insulating resin, resulting in the promotion of heat dissipation from the neutral busbar 14.

In contrast, the bubbles B, which has formed in the insulating film of the resinous seal 61 and is located adjacently around the neutral busbar 14, works to absorb a distortion, such as an expansion, of the insulating film due to temperature change, such as temperature increase in the insulating resin. This minimizes the risk of the occurrence of cracks in the insulating resin of the resinous seal 61, thus reducing heat dissipation from the neutral busbar 14 due to cracks in the insulating resin.

The annular resinous seal 61 includes, as can be seen in FIG. 8, a first annular region A1 and a second annular region A2; the first annular region A1 is located radially inward relative to the second annular region A2, and therefore the second region A2 is located radially outward relative to the first annular region A1.

The first annular region A1 encapsulates the conductor segments 30 of the stator winding 12, and the second annular region A2 encapsulates the neutral busbar 14. The second annular region A2 of the resinous seal 61 arranged to surround the neutral busbar 14 serves as a bubble region that has the bubbles B formed therein; the number or number density of bubbles B formed in the second annular region A2 is greater than the number or the number density of bubbles formed in the first annular region A1. The number density of bubbles formed in, for example, the first annular region A1 represents the number of bubbles formed in the first annular region A1 per unit volume of the first annular region A1.

The number or the number density of bubbles formed in the second annular region A2 can be preferably set to be as small as possible. This prevents poor electrical isolation between the conductor segments 30 of the respective-phase windings of the stator winding 12.

Because the neutral busbar 14 is encapsulated by the insulating resin of the resinous seal 61, the inner periphery 61A of the insulating resin of the resinous seal 61 is in contact with the outer periphery of the neutral busbar 14.

The degree of distortion in the inner periphery 61A of the insulating resin of the resinous seal 61 would therefore become larger. From this viewpoint, the bubbles B formed in the surrounding portion of the insulating resin can include one or more bubbles located to be in contact with at least part of the outer periphery of the neutral busbar 14 (see FIG. 9A). This configuration minimizes the degree of distortion in the inner periphery 61A of the insulating resin of the resinous seal 61. This therefore minimizes the risk of the occurrence of cracks in the insulating resin of the resinous seal 61, thus reducing heat dissipation from the neutral busbar 14 due to cracks in the insulating resin.

Because the neutral busbar 14 has a substantially rectangular shape in its lateral cross section so that the neutral busbar 14 has corners, the inner periphery 61A of the insulating resin of the resinous seal 61 has concave portions, each of which is in contact with a corresponding one of the corners of the neutral busbar 14. Extension or shrinkage of the insulating resin of the resinous seal 61 due to temperature change of the stator 10 may result in stress concentration onto each concave portion of the inner periphery 61A of the insulating resin of the resinous seal 61. This therefore would result in cracks being likely to occur at each concave portion of the inner periphery 61A of the insulating resin of the resinous seal 61.

Figure 9A:
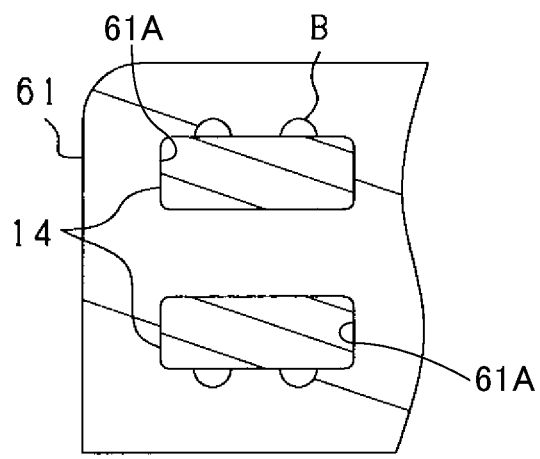
FIG. 9A is an enlarged vertical cross section that illustrates a first example of the positions of bubbles formed in an insulating resin of the resinous seal and located around the neutral busbar.
Figure 9B:
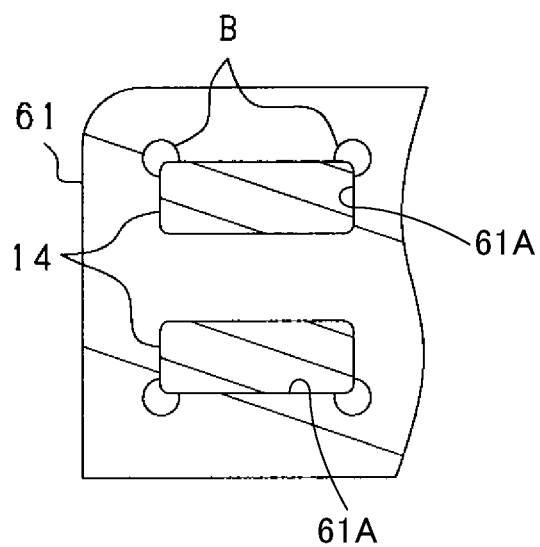
FIG. 9B is an enlarged vertical cross section that illustrates a second example of the positions of the bubbles formed in the insulating resin of the resinous seal and located around the neutral busbar.

From this viewpoint, the bubbles B formed in the surrounding portion of the insulating resin can include bubbles located around each concave portion of the inner periphery 61A of the insulating resin of the resinous seal 61, i.e., each corner of the neutral busbar 14 (see FIG. 9B). This configuration minimizes the risk of the occurrence of cracks at each concave portion of the inner periphery 61A of the insulating resin of the resinous seal 61, thus reducing heat dissipation from the neutral busbar 14 due to cracks in the insulating resin.

In particular, bending and notching is applied to a base material for the body 41 of the neutral busbar 1, so that the body 41 of the neutral busbar 1 is manufactured. For this reason, the body 41 of the neutral busbar 14 may have, on its outer periphery, asperities due to the bending and/or notching. At least part of the inner periphery 61A of the insulating resin of the resinous seal 61 is in contact with the asperities of the outer periphery of the neutral busbar 14. The asperities of the outer periphery of the neutral busbar 14 may result in stress concentration onto the at least part of the inner periphery 61A of the insulating resin of the resinous seal 61. This therefore would result in cracks being likely to occur at the at least part of the inner periphery 61A of the insulating resin of the resinous seal 61.

From this viewpoint, the resinous seal 61 can be preferably configured such that the bubbles B formed in the surrounding portion of the insulating resin are located around the at least part of the inner periphery 61A of the insulating resin of the resinous seal 61. This configuration reduces the level of stress concentration onto the at least part of the inner periphery 61A of the insulating resin of the resinous seal 61, thus minimizing the risk of the occurrence of cracks at the at least part of the inner periphery 61A of the insulating resin of the resinous seal 61, and accordingly reducing heat dissipation from the neutral busbar 14 due to cracks in the insulating resin.

Figure 10:
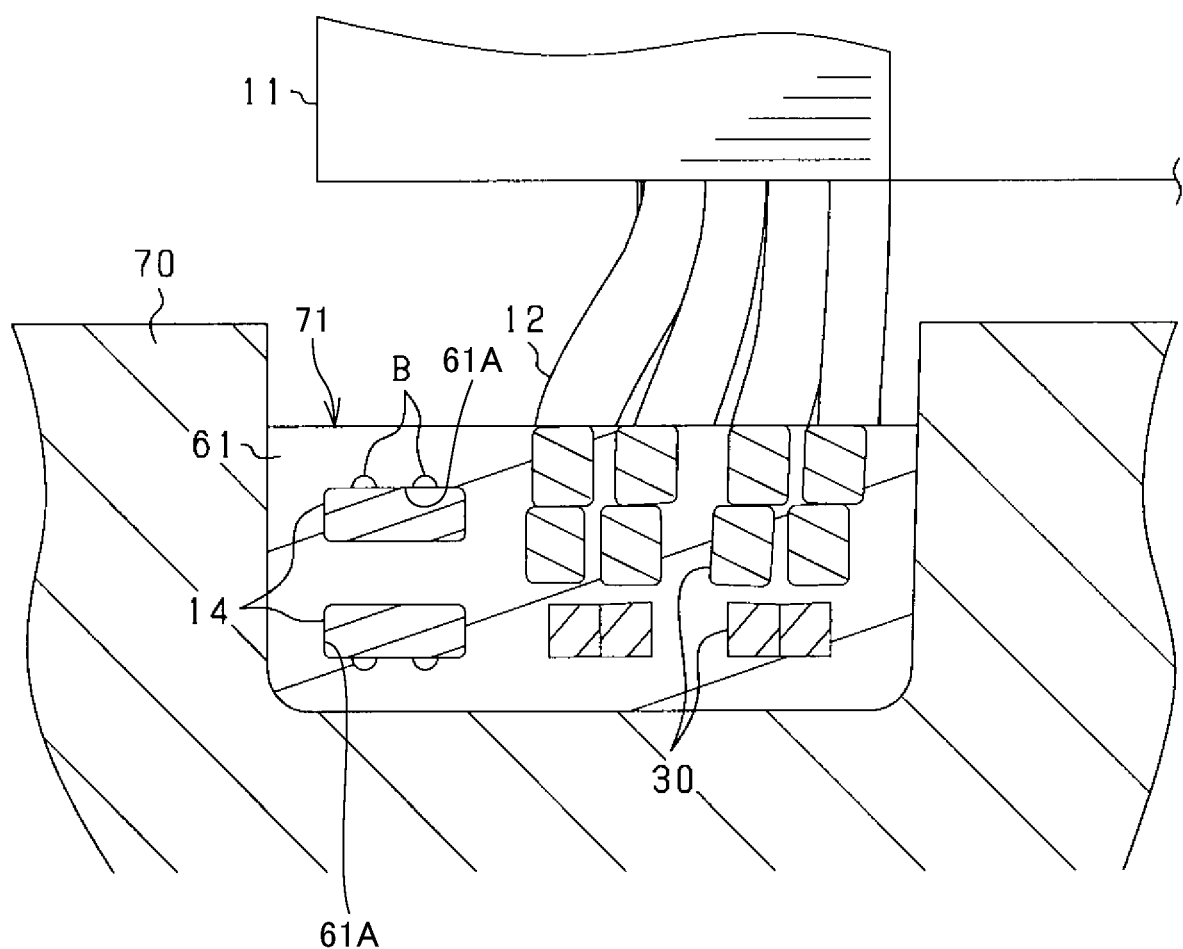
FIG. 10 is an enlarged vertical sectional view of the coil end of the stator for describing how to perform a method of molding the resinous seal so as to encapsulate the conductor portions of the stator winding and the neutral busbar.

FIG. 10 is an enlarged vertical sectional view of the coil end CE2 of the stator 10 for describing how to perform a method of molding the resinous seal 61 so as to encapsulate the conductor portions 30 of the stator winding 12 and the neutral busbar 14.

The molding method is carried out after the neutral busbar 14 is connected to the coil end CE2 of the stator winding 12.

Specifically, the molding method prepares a mold 70 that includes an annular groove 71 that is configured to be in conformity with the configuration of the resinous seal 61 to be molded.

Then, the molding method injects liquid resin material into the annular groove 71 of the mold 70, and thereafter puts the coil end CE2 into the liquid resin material, so that the resinous seal 61 is molded in the mold 70. Specifically, the coil end CE2 is oriented to face downward in the vertical direction and then immersed into the liquid resin material in the annular groove 71.

Then, the molding method performs a step of hardening the liquid resin material, thus completely molding the resinous seal 61 in the mold 70.

In particular, the molding method includes a step of performing, before the hardening step, a step of forming bubbles in the liquid resin material around the neutral busbar 14.

Figure 11A:
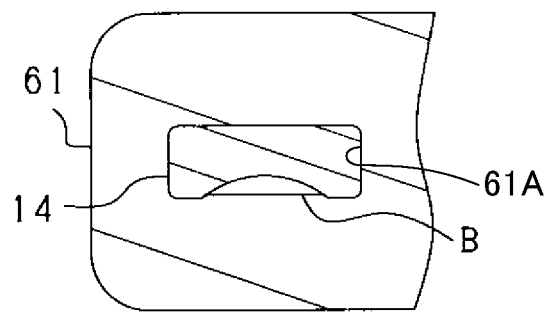
FIG. 11A is an enlarged vertical sectional view of a first example of the configuration of the neutral busbar for forming bubbles in the insulating resin and around the neutral busbar.

For example, as can be seen in FIG. 11A, at least part of the outer periphery of the neutral busbar 14 has a concave recess in which air has been accommodated. While the coil end CE2, which includes the neutral busbar 14 illustrated in FIG. 11A, is immersed in the liquid resin material in the annular groove 71, the hardening step is carried out, so that the bubbles B based on the accommodated air are formed in the insulating resin of the resinous seal 61 while being located around the neutral busbar 14.

Figure 11B:
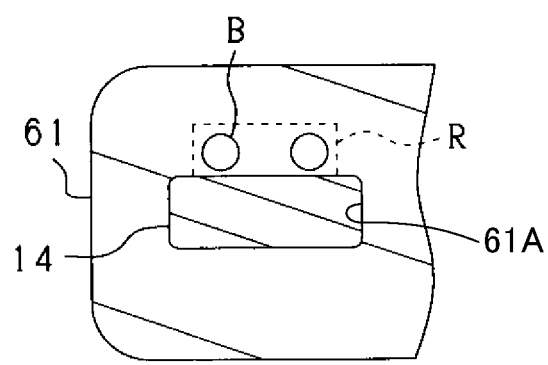
FIG. 11B is an enlarged vertical sectional view of a second example of the configuration of the neutral busbar for forming bubbles in the insulating resin and around the neutral busbar.

As another example, as can be seen in FIG. 11B, a foamable resin member R is mounted to at least part of the outer periphery of the neutral busbar 14. While the coil end CE2, which includes the neutral busbar 14 illustrated in FIG. 11B, is immersed in the liquid resin material in the annular groove 71, the hardening step is carried out, so that the bubbles B based on the foamable resin member R are formed in the insulating resin of the resinous seal 61 while being located around the neutral busbar 14.

As a further example, while the coil end CE2 is immersed in the liquid resin material in the annular groove 71, air is directly injected into the liquid resin material. Thereafter, the hardening step is carried out, so that the bubbles B based on the injected air are formed in the insulating resin of the resinous seal 61 while being located around the neutral busbar 14.

The embodiment described set forth above offers the following beneficial advantages.

Specifically, the resinous seal 61 is configured to have the bubbles B formed in the surrounding portion of the insulating resin; the surrounding portion is located adjacently around the neutral busbar 14.

This configuration of the resinous seal 61 enables the thermal resistance of the surrounding portion of the insulating resin, which is located around the neutral busbar 14, to be higher, making it possible to reduce heat dissipation from the neutral busbar 14 through the insulating resin of the resinous seal 61. This reduction in the heat dissipation from the neutral busbar 14 curbs a decrease in the temperature of the neutral busbar 14, making it possible for the temperature sensor 51 integrally mounted to the neutral busbar 14 to measure a value of the temperature of the stator 10 more properly.

For example, the bubbles B can include the upper bubbles B1 located between the upper major surface of the neutral busbar 14 and the outer upper surface of the resinous seal 61, and the lower bubbles B2 located between the lower major surface of the neutral busbar 14 and the outer lower surface of the resinous seal 61. Because heat in the neutral busbar 14 is likely to be dissipated from each of the larger upper and lower major surfaces of the neutral busbar 14, the upper bubbles B1 located between the upper major surface of the neutral busbar 14 and the outer upper surface of the resinous seal 61 makes it possible to reduce heat dissipation from the neutral busbar 14 through the upper major surface of the neutral busbar 14. Similarly, the lower bubbles B2 located between the lower major surface of the neutral busbar 14 and the outer lower surface of the resinous seal 61 makes it possible to reduce heat dissipation from the neutral busbar 14 through the lower major surface of the neutral busbar 14.

Distortions would be likely to occur, due to, for example, thermal stress, in the inner periphery 61A of the insulating resin of the resinous seal 61, which is in contact with the outer periphery of the neutral busbar 14.

From this viewpoint, the resinous seal 61 can be preferably configured such that the bubbles B formed in the surrounding portion of the insulating resin have bubbles located to be in contact with at least part of the outer periphery of the neutral busbar 14 (see FIG. 9A). This configuration minimizes the risk of the occurrence of cracks in the insulating resin of the resinous seal 61 due to, for example, thermal stress, thus reducing heat dissipation from the neutral busbar 14 due to cracks in the insulating resin. This accordingly makes it possible for the temperature sensor 51 integrally mounted to the neutral busbar 14 to measure a value of the temperature of the stator 10 more properly.

The inner periphery 61A of the insulating resin of the resinous seal 61 has the concave portions, each of which is in contact with a corresponding one of the corners of the neutral busbar 14. Extension or shrinkage of the insulating resin of the resinous seal 61 due to temperature change of the stator 10 may result in stress concentration onto each concave portion of the inner periphery 61A of the insulating resin of the resinous seal 61. This therefore would result in cracks being likely to occur at each concave portion of the inner periphery 61A of the insulating resin of the resinous seal 61.

From this viewpoint, the resinous seal 61 can be preferably configured such that the bubbles B formed in the surrounding portion of the insulating resin include bubbles located around each concave portion of the inner periphery 61A of the insulating resin of the resinous seal 61 (see FIG. 9B). This configuration minimizes the risk of the occurrence of cracks at each concave portion of the inner periphery 61A of the insulating resin of the resinous seal 61, thus reducing heat dissipation from the neutral busbar 14 due to cracks in the insulating resin. This accordingly makes it possible for the temperature sensor 51 integrally mounted to the neutral busbar 14 to measure a value of the temperature of the stator 10 more properly.

The second annular region A2 of the resinous seal 61 arranged to surround the neutral busbar 14 has the bubbles B formed therein; the number or the number density of bubbles B formed in the second annular region A2 can be greater than the number or the number density of bubbles formed in the first annular region A1 arranged to surround the conductor segments 30 of the stator winding 12. In other words, the number or the number density of bubbles formed in the first annular region A1 arranged to surround the conductor segments 30 of the stator winding 12 can be smaller than the number or the number density of bubbles B formed in the second annular region A2 arranged to surround the neutral busbar 14.

This prevents poor electrical isolation between the conductor segments 30 of the respective-phase windings of the stator winding 12 due to the existence of bubbles in the first annular region A1 arranged to surround the conductor segments 30 of the stator winding 12.

MODIFICATIONS

The present disclosure is not limited to the embodiment described above, and can be variably modified within the scope of the present disclosure.

The neutral busbar 14 according to the above embodiment is configured such that the end portion 41a1 of the body 41 of the neutral busbar 14 is folded back over the end 41a2 of the remaining portion of the body 41 to form the U-shaped clamp 41a having the two arms 41a1 and 41a2, but the neutral busbar 14 can be configured without such a folded U-shaped clamp. The resinous seal 61 according to this modification can be configured such that (I) Upper bubbles are located between the upper major surface of the body 41, which is farther away from the stator core 11 than the lower major surface of the body 41 is, and the outer upper surface of the resinous seal 61

(II) Lower bubbles are located between the lower major surface of the body 41, which is closer to the stator core 11 than the upper major surface of the body 41 is, and the outer lower surface of the resinous seal 61

Each phase stator winding 12 according to the above embodiment is made up of the discrete conductor segments 30 joined together. Alternatively, each phase stator winding 12 can be made up of a continuous wire wound in the slots 23 of the stator core 11 in the form of a wave winding.

The stator 10 is configured such that the air gap is created between the axial end surface of the stator core 11 and the outer lower surface of the resinous seal 61. Alternatively, the stator 10 can be configured such that the resinous seal 61 is shaped to axially cover the whole of the coil end CE2.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A stator for a rotating electrical machine, the stator comprising:
   a stator core;
   a stator winding located in or around the stator core and having a coil end exposed outside a corresponding end of the stator core;
   a neutral busbar connected to the coil end of the stator winding;
   a temperature sensor mounted to the neutral busbar; and
   a resinous seal comprising an insulating resin, the insulating resin of the resinous seal being arranged to cover an axial end portion of the coil end and the neutral busbar,
   the resinous seal being configured to have bubbles formed in the insulating resin, the bubbles being located around the neutral busbar, wherein
   the resinous seal has opposing first and second outer surfaces;
   the neutral busbar has opposing first and second major surfaces, the first and second major surfaces being arranged to face the respective first and second outer surfaces; and
   the bubbles include at least one of:
      first bubbles located between the first outer surface of the resinous seal and the first major surface of the neutral busbar; and
      second bubbles located between the second outer surface of the resinous seal and the second major surface of the neutral busbar.

2. The stator according to claim 1, wherein:
   the neutral busbar has one end portion folded back over an end of a remaining portion of the neutral busbar to form a U-shaped clamp having two arms; and
   the temperature sensor is sandwiched by the two arms of the U-shaped clamp.

3. A stator for a rotating electrical machine, the stator comprising:
   a stator core;
   a stator winding located in or around the stator core and having a coil end exposed outside a corresponding end of the stator core;
   a neutral busbar connected to the coil end of the stator winding;
   a temperature sensor mounted to the neutral busbar; and
   a resinous seal comprising an insulating resin, the insulating resin of the resinous seal being arranged to cover an axial end portion of the coil end and the neutral busbar,
   the resinous seal being configured to have bubbles formed in the insulating resin, the bubbles being located around the neutral busbar, wherein
   the bubbles formed in the insulating resin of the resinous seal include one or more bubbles located to be in contact with at least part of an outer periphery of the neutral busbar.

4. The stator according to claim 3, wherein:
   the neutral busbar has one end portion folded back over an end of a remaining portion of the neutral busbar to form a U-shaped clamp having two arms; and
   the temperature sensor is sandwiched by the two arms of the U-shaped clamp.

5. A stator for a rotating electrical machine, the stator comprising:
   a stator core;
   a stator winding located in or around the stator core and having a coil end exposed outside a corresponding end of the stator core;
   a neutral busbar connected to the coil end of the stator winding;
   a temperature sensor mounted to the neutral busbar; and
   a resinous seal comprising an insulating resin, the insulating resin of the resinous seal being arranged to cover an axial end portion of the coil end and the neutral busbar,
   the resinous seal being configured to have bubbles formed in the insulating resin, the bubbles being located around the neutral busbar, wherein
   the neutral busbar has corners; and
   the bubbles include one or more bubbles located around each corner of the neutral busbar.

6. The stator according to claim 5, wherein:
   the neutral busbar has one end portion folded back over an end of a remaining portion of the neutral busbar to form a U-shaped clamp having two arms; and the temperature sensor is sandwiched by the two arms of the U-shaped clamp.

7. A stator for a rotating electrical machine, the stator comprising:
a stator core;
a stator winding located in or around the stator core and having a coil end exposed outside a corresponding end of the stator core;
a neutral busbar connected to the coil end of the stator winding;
a temperature sensor mounted to the neutral busbar; and
a resinous seal comprising an insulating resin, the insulating resin of the resinous seal being arranged to cover an axial end portion of the coil end and the neutral busbar,
the resinous seal being configured to have bubbles formed in the insulating resin, the bubbles being located around the neutral busbar, wherein
the stator winding comprises multiphase stator windings;
the resinous seal includes a first region and a second region, the first region being arranged to encapsulate ends of the respective multiphase stator winding, the second region being arranged to encapsulate the neutral busbar; and
the bubbles include:
first regional bubbles included in the bubbles and formed in the first region; and
second regional bubbles included in the bubbles and formed in the second region, a number or a number density of the first regional bubbles being smaller than a number or a number density of the second regional bubbles.

8. The stator according to claim 7, wherein:
the neutral busbar has one end portion folded back over an end of a remaining portion of the neutral busbar to form a U-shaped clamp having two arms; and
the temperature sensor is sandwiched by the two arms of the U-shaped clamp.

* * * * *